United States Patent
Wang

(10) Patent No.: US 10,444,121 B2
(45) Date of Patent: Oct. 15, 2019

(54) FAULT DETECTION USING EVENT-BASED PREDICTIVE MODELS

(71) Applicant: SAP SE, Walldorf (DE)

(72) Inventor: Chen Wang, Singapore (SG)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 15/144,846

(22) Filed: May 3, 2016

(65) Prior Publication Data

US 2017/0322120 A1 Nov. 9, 2017

(51) Int. Cl.
*G01M 99/00* (2011.01)
(52) U.S. Cl.
CPC .................. *G01M 99/008* (2013.01)
(58) Field of Classification Search
CPC .................................. G01M 99/008
USPC ......................................... 702/185
See application file for complete search history.

(56) References Cited

U.S. PATENT DOCUMENTS

| | | | | |
|---|---|---|---|---|
| 6,847,917 | B2* | 1/2005 | Bechhoefer | G01H 1/003 702/182 |
| 7,136,794 | B1* | 11/2006 | Bechhoefer | G01H 1/003 703/7 |
| 2004/0066593 | A1* | 4/2004 | Kolker | G01R 31/025 361/42 |
| 2005/0258456 | A1* | 11/2005 | Margolin | G11C 29/006 257/213 |
| 2005/0281596 | A1* | 12/2005 | Nakagawa | G03G 15/0131 399/350 |
| 2005/0286916 | A1* | 12/2005 | Nakazato | G03G 15/6573 399/16 |
| 2006/0056241 | A1* | 3/2006 | Auge | G11C 29/50 365/189.011 |
| 2007/0133322 | A1* | 6/2007 | Proell | G11C 29/24 365/200 |
| 2009/0058443 | A1* | 3/2009 | Ohashi | G01R 31/2856 324/750.05 |
| 2009/0112498 | A1* | 4/2009 | Krone | G01R 31/2829 702/69 |
| 2009/0132180 | A1* | 5/2009 | Pearce | F02D 41/20 702/38 |
| 2009/0204347 | A1* | 8/2009 | Nowicki | G01R 31/024 702/58 |
| 2009/0276136 | A1* | 11/2009 | Butler | G05B 23/0281 701/100 |
| 2009/0319827 | A1* | 12/2009 | Nakazato | G03G 15/5079 714/26 |

(Continued)

OTHER PUBLICATIONS

SAP SE, SAP HANA Predictive Analysis Library (PAL), SAP HANA Platform SPS 11, "http://help.sap.com/hana/sap_hana_predictive_analysis_library_pal_en.pdf", 2016, Document Version 11, SAP SE or an SAP affiliate company.

(Continued)

*Primary Examiner* — Sheikh Maruf
(74) *Attorney, Agent, or Firm* — Klarquist Sparkman, LLP

(57) ABSTRACT

A proposed solution to analyze event data from sensors of devices of a manufacturing environment to identify relationships of events to predict faults in devices is disclosed. The analysis includes conditional probability model and Apriori model. The relationships are used to determine a device health index which is compared to real-time event data to predict faults in a device.

18 Claims, 8 Drawing Sheets

(56) References Cited

U.S. PATENT DOCUMENTS

| | | | | |
|---|---|---|---|---|
| 2009/0324259 | A1* | 12/2009 | Ue | G03G 15/5079 399/9 |
| 2010/0024777 | A1* | 2/2010 | Hoffmann | F02D 41/2096 123/479 |
| 2010/0094594 | A1* | 4/2010 | Yamashita | G03G 15/502 702/184 |
| 2011/0004419 | A1* | 1/2011 | Ue | G05B 23/0254 702/34 |
| 2012/0066169 | A1* | 3/2012 | Ghanadan | G06N 7/005 706/52 |
| 2012/0270199 | A1* | 10/2012 | Malik | A61B 5/0002 434/322 |
| 2012/0296899 | A1* | 11/2012 | Adams | G16H 10/40 707/736 |
| 2013/0024160 | A1* | 1/2013 | Mihaylov | G06Q 10/06 702/185 |
| 2013/0060524 | A1* | 3/2013 | Liao | G05B 23/0254 702/184 |
| 2013/0124129 | A1* | 5/2013 | Waters | G01C 17/38 702/92 |
| 2014/0067327 | A1* | 3/2014 | Jiang | G05B 23/024 702/185 |
| 2014/0172371 | A1* | 6/2014 | Zhu | G06F 11/0709 702/185 |
| 2014/0200815 | A1* | 7/2014 | Hung | G01V 1/34 702/16 |
| 2014/0365179 | A1* | 12/2014 | Horowitz | G05B 23/0254 702/185 |
| 2015/0073751 | A1* | 3/2015 | Liao | G05B 19/058 702/185 |
| 2015/0185713 | A1* | 7/2015 | Glickfield | H04L 67/12 700/44 |
| 2015/0219530 | A1* | 8/2015 | Li | G05B 23/0243 702/181 |
| 2015/0222621 | A1* | 8/2015 | Baum | H04W 4/70 726/9 |
| 2015/0279487 | A1* | 10/2015 | Pious | G11C 29/44 365/96 |
| 2015/0333992 | A1* | 11/2015 | Vasseur | H04L 12/4633 370/252 |
| 2015/0338449 | A1* | 11/2015 | Cheded | G01R 31/02 702/185 |
| 2016/0105402 | A1* | 4/2016 | Soon-Shiong | H04L 63/0428 713/164 |
| 2017/0105095 | A1* | 4/2017 | Um | H04W 4/80 |
| 2017/0372216 | A1* | 12/2017 | Awiszus | G06N 7/005 |
| 2018/0012153 | A1* | 1/2018 | Hu | G06Q 10/04 |
| 2018/0276351 | A1* | 9/2018 | Patton | H04L 63/102 |

OTHER PUBLICATIONS

Stephan Haller et al., "The Internet of Things in an Enterprise Context", Lecture Notes in Computer Science, Future Internet, Sep. 2008, pp. 14-28, vol. 5468, Springer-Verlag Berlin, Heidelberg.

Sonja Meyer et al., "Internet of Things-aware Process Modeling: Integrating IoT Devices as Business Process Resources", CAiSE'13 Proceedings of the 25th international conference on Advanced Information Systems Engineering, Jun. 2013, pp. 84-98, Springer-Verlag Berlin, Heidelberg.

Ralf Ackermann, "M2M, Internet of Things and Industry 4.0—An Industry Perspective", 2013, SAP AG.

Rakesh Agrawal et al., "Fast Algorithms for Mining Association Rules", VLDB '94 Proceedings of the 20th International Conference on Very Large Data Bases, Sep. 1994, pp. 487-499, Morgan Kaufmann Publishers Inc. San Francisco, CA, USA.

Tilmann Rabl et al., "DEBS Grand Challenge: Solving Manufacturing Equipment Monitoring Through Efficient Complex Event Processing", DEBS '12 Proceedings of the 6th ACM International Conference on Distributed Event-Based Systems, Jul. 2012, pp. 335-340, ACM, Berlin, Germany.

Avin D. Mathew et al., "Reducing Maintenance Cost Through Effective Prediction Analysis and Process Integration", Advances in Vibration Engineering, 2006, pp. 87-96, vol. 5, No. 2, Krishtel eMaging Solutions.

H. M. Hashemian et al., "State-of-the-Art Predictive Maintenance Techniques", IEEE Transactions on Instrumentation and Measurement, Oct. 2011, pp. 3480-3492, vol. 60, No. 10, IEEE.

Ruben Sipos et al., "Log-based Predictive Maintenance", KDD '14 Proceedings of the 20th ACM SIGKDD International Conference on Knowledge Discovery and Data Mining, Aug. 2014, pp. 1867-1876, ACM, New York, USA.

Aleksandra Marjanovic et al., "Applications of Predictive Maintenance Techniques in Industrial Systems", Serbian Journal of Electrical Engineering, Nov. 2011, pp. 263-279, vol. 8, No. 3.

Liudmila Ulanova et al., "Efficient Long-Term Degradation Profiling in Time Series for Complex Physical Systems", KDD '15 Proceedings of the 21th ACM SIGKDD International Conference on Knowledge Discovery and Data Mining, Aug. 2015, pp. 2167-2176, ACM, Sydney, Australia.

Hong-Hai Do et al., "Down with the downtime: Towards an Integrated Maintenance and Production Management Process based on Predictive Maintenance Techniques", Informatik für Menschen, Band 2, Beiträge der 36. Jahrestagung der Gesellschaft für Informatik e.V. (GI), 2006, pp. 36-42, vol. 94, GI, Dresden, Germany.

Antonio Miguel Cruz, "Evaluating Record History of Medical Devices Using Association Discovery and Clustering Techniques", Expert Systems with Applications, Oct. 2013, pp. 5292-5305, vol. 40, No. 13, Elsevier Ltd.

Julien Rabatel et al., "Anomaly Detection in Monitoring Sensor Data for Preventive Maintenance", Expert Systems with Applications, Jun. 2011, pp. 7003-7015, vol. 38, No. 6, Elsevier Ltd.

Pedro Mota Pereira et al., "Failure Prediction—An Application in the Railway Industry", Discovery Science, 2014, pp. 264-275, vol. 8777, Springer International Publishing AG.

Zbigniew Jerzak et al., "The DEBS 2012 Grand Challenge", DEBS '12 Proceedings of the 6th ACM International Conference on Distributed Event-Based Systems, Jul. 2012, pp. 393-398, ACM, Berlin, Germany.

Dennis Geesen et al., "DEBS Grand Challenge: Odysseus as Platform to Solve Grand Challenges", DEBS '12 Proceedings of the 6th ACM International Conference on Distributed Event-Based Systems, Jul. 2012, pp. 359-364, ACM, Berlin, Germany.

Kangheng Wu et al., "DEBS Grand Challenge: Event Processing of Monitoring Data of Large Hi-Tech Manufacturing Equipment", DEBS '12 Proceedings of the 6th ACM International Conference on Distributed Event-Based Systems, Jul. 2012, pp. 387-392, ACM, Berlin, Germany.

* cited by examiner

FAULT DETECTION USING EVENT-BASED PREDICTIVE MODELS

TECHNICAL FIELD

The present disclosure relates generally to fault diagnosis and fault prediction of devices.

BACKGROUND

In a manufacturing environment, a system of devices may be used in the process to produce a product. The devices may include different types of equipment. Due to the competitive nature of the manufacturing industry, it is imperative that the system of devices operate properly. Proper operations require regular maintenance of the devices. However, even in spite of regular maintenance, devices still incur failures, resulting in stoppage in the manufacturing process. Such stoppage results in delays and loss of revenues.

From the above discussion, it is desirable to diagnose faults in devices to predict when a fault may occur before it occurs to prevent stoppage in the manufacturing process.

SUMMARY

A method of for diagnosing faults to predict faults is described herein. The method includes providing, to an analyzer server, event data of events from sensors for measuring operating metrics of devices of a system of devices. The event data includes alarm events of devices. Event data is analyzed to identify relationships of events. A device health index is defined based on identified relationships of events to predict failures based on the DHI. Events from the sensors are monitored by the analyzer server to determine possible failures based on the DHI.

In one embodiment, a system for diagnosing faults to predict faults is disclosed. The system includes a database module which stores event data of events from sensors for measuring operating metrics of devices of a system of devices. The event data includes alarm events of devices. The system also includes a processor module. The processor module analyzes the event data to identify relationships of events, monitors events and comparing the events with a DHI which is defined based on identified relationships of events, and predicts failures based on the DHI.

In another embodiment, a non-transitory computer-readable medium having stored thereon program code which is executable by a computer is disclosed. The program code includes providing, to an analyzer server, event data of events from sensors for measuring operating metrics of devices of a system of devices. The event data includes alarm events of devices. The event data is analyzed to identify relationships of events using a conditional probability analysis and an Apriori analysis. The analyzer server monitors events from sensors of the devices to determine possible failures based on the DHI which is defined based on identified relationships of events to predict failures based on the DHI.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for fault diagnosis and prediction is described herein. Failure diagnosis and prediction may be applied to, for example, "Internet of Things" (IoT) data. IoT data, for example, may include data from machines, devices and appliances. IoT technology may be used for analyzing and predicting or faults in a manufacturing environment. Predicting faults from the IoT data is based on occurrence of events. In particular, fault diagnosis and prediction is event based. For example, the framework can predict possible faults of other devices in the manufacturing environment based on a causal relationship of events. This enables predictive maintenance actions to prevent faults in the manufacturing environment before faults occur.

Figure 1:
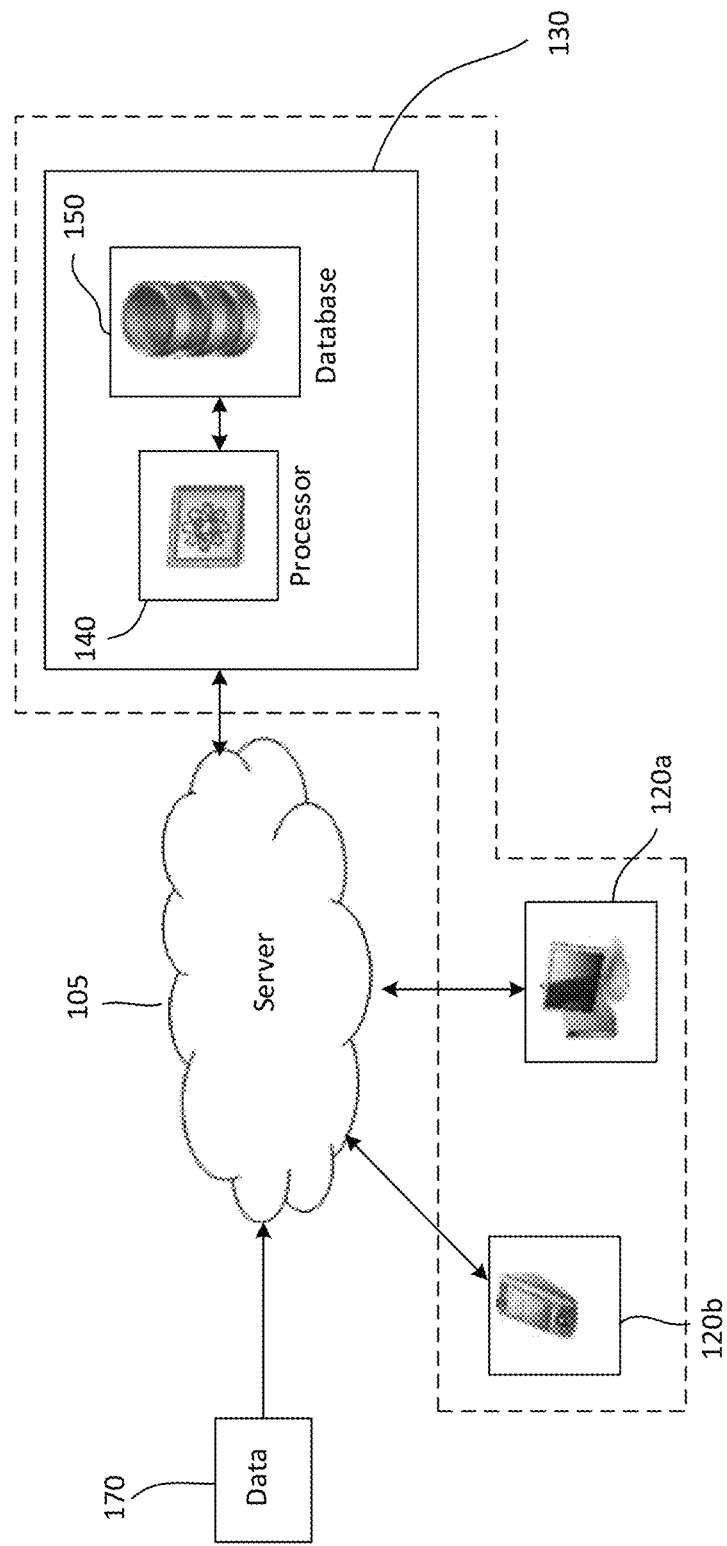
FIG. 1 shows an embodiment of an environment.

FIG. 1 shows a simplified block diagram of an exemplary environment 100. The environment, for example, facilitates fault diagnosis and prediction. In one embodiment, the environment includes a fault analyzer system or predictor system 130. The fault analyzer diagnoses data from a data collection system or data source 170 to predict faults. The fault analyzer system may have a client/server architecture 105. For example, the fault analyzer system may have a distributed client/server architecture. The fault analyzer system includes an analyzer server 130 and client devices 120a-b. The server performs analysis on the data, based on input from a user and provides feedback to the user through a client device. It is understood that numerous users may communicate with the server through client or user devices.

In the distributed architecture, the server may include one or more computers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component.

In the case where the server includes more than one computer, they are connected through a communication network such as an internet, intranet, local area network (LAN), wide area network (WAN) or a combination thereof. The servers, for example, are part of the same private network. The servers may be located in single or multiple locations. Other configurations of servers may also be useful.

As for client or user devices, they may be any computing devices. A computing device, for example, includes a local memory and a processor. The computing device may further include a display. The display may serve as an input and output component of the user device. In some cases, a keyboard or pad may be included to serve as an input device. The memory may be volatile or non-volatile types of non-transitory computer-readable media such as magnetic media, optical media, RAM, ROM, removable media, or any other suitable memory component. Various types of processing devices may serve as user devices. For example, the user devices may include a personal computer or a smart phone. Other types of user devices, such as laptops or tablet personal computers (PCs) may also be useful.

Communication between the user devices and server may be through a communication network, such as the internet, intranet, LAN, WAN or a combination thereof. Other type of networks may also be useful. In some cases, the network may be a cloud. A user may connect to the server using a user device. The user device may be referred to as the client side while the server may be referred to as the server side. A user may access the server by logging in the user's respective account with, for example, a password using a client device. The client device may have an application interface or user interface (UI) which is used to communicate with the server. Other types of user devices may also be useful for communicating with the server. For example, a user device may be a machine or an equipment with a controller having a communication interface for communicating with the server via the internet or network.

The data collection system, in one embodiment, includes sensors for sensing events of devices. Devices, for example, include equipment or tools in a manufacturing environment. The production equipment, for example, is used in manufacturing of a product. The production equipment may include production tools which are used in various types of industries, such as energy, chemical, food, cement or paper industry. Other types of devices may also be useful.

Sensors are provided for the production equipment or devices. For example, one or more sensors are provided for a tool in the manufacturing environment. The sensors, for example, monitor various operating metrics of the production tools. For example, sensors may be used to measure operating pressure, operating temperature, and power consumption such as voltage and current. Other types of metrics may be monitored by sensors. In the case of a chemical plant, sensors may be used to monitor operation of valves, such as monitoring pressure and temperature. Monitoring other types of metrics, such as input and output levels, may also be useful. Different equipment or tools may have different operating metrics monitored. For example, different sensors or sets of sensors may be used for different tools.

As an example, a chemical process equipment may include tanks. A tank may include three sensors to measure temperature, liquid level and pressure within the tank. Additionally, sensors may be provided to monitor quantity of input and output of materials, for example, in unit of ton/second. Other types of sensors may also be useful.

In one embodiment, the sensors detect events in the device tool. For example, an event is a change in operating metrics. An event may be a change of x % of normal operating parameters. In other embodiments, an event may be when the operating metric exceeds a defined threshold value. In some cases, upper and lower threshold values may be defined. An event occurs when the operating metric dips below the lower threshold value or exceeds the upper threshold value. An event, for example, is when an abnormal operating parameter occurs or a failure. Other types of events may also be useful. For example, an event may include when an equipment is switched on or off, when a control process is loaded and enabled, when a database upload or download process is completed, and when a status of a system is changed, either automatically or manually by an operator.

Upon occurrence of an event, an associated sensor triggers an alarm. The event data of the event is transmitted to the server. For example, data associated with the event is streamed to the server. The event data may be referred to as IoT data. The data may be streamed to the server and stored in a log file. For example, one log file, such as the event log file is used to store the streamed event data. The event data may include the sensor id which detected the event, time stamp of the event, message code which indicates that type of event as well as an operator input message. In some cases, other log files may be included in the database. For example, readings of key sensors may be performed regularly (timed) and may be stored in another log file, such as a timed log file. Other types of log files may also be provided for other types of readings.

Table 1 below shows an exemplary data structure of an event:

TABLE 1

| Sensor ID | Time | Message Code | Operator Input |
| --- | --- | --- | --- |

Other structures for the event may also be useful. For example, the event data may include other fields. Furthermore, it is understood that since data are from different sources, they may have different structures as well as being unstructured. For example, unstructured data may be strings of different lengths.

Table 2 below shows exemplary message code types:

TABLE 2

| Message Code | Alarm Type |
| --- | --- |
| A | Abnormal sensor reading |
| B | Recovery from abnormal status |
| C | Threshold value changes |
| D | Operator's Input Message |

Providing other types of alarm messages may also be useful.

As for the analyzer server, it includes a processor module 140 and a database module 150. The processor module receives event or IoT data from the data source 170. The IoT data is streamed to the database module. In addition, the processor detects anomalous events in the IoT data. For example, the processor continuously monitors streamed events and compares them with a predictive model. In one embodiment, the processor module includes a processor capable of analyzing high velocity and high volume of streaming data in real-time. For example, the processor may be an event stream processor (ESP). The ESP, in one embodiment, is an ESP from SAP Sybase. Other types of processors may also be useful.

As for the database module, it processes and analyzes streamed data from the data source. For example, streamed data is processed and analyzed from the processor module. In one embodiment, the database module includes natively integrated processing engines to support data streaming, predictive analysis, relationship modeling, geospatial processing, on-the-fly complex calculations, machine leaning and text processing. Providing other native processing engines may also be useful. The native engines provide the foundation for supporting unpredictable workloads of IoT data and solutions.

In one embodiment, the database module includes an in-memory database. For example, the database module is a SAP HANA database. Other types of databases may also be useful. The database module may include analytic tools for analyzing the IoT data. For example, the analytic tools may include clustering, classification and association tools. Other types of analytic or data mining tools may also be useful. The database module analyzes the IoT data to generate a predictive model used to predict faults based on event data. For example, a graph of sensors and devices is used to describe the relationships among the sensors and devices. In one embodiment, the analytic tools may be PAL from SAP for SAP HANA database. Providing other types of analytic and data mining tools may also be useful.

The predictive models are fed back to the processor module as reference modules to continuously monitor real-time events and detect anomalous sensor readings that could signify possible faults in the process equipment or tools. When highly probable faults are detected based on the event data by the processor module, alarms, such as alert messages and appropriate actions may be sent to relevant user or users through client device or devices by the processor module. For example, alert messages may be sent to client devices of operators of the production environment.

Providing the analytic tools in the database module enables high performance in the system. For example, the heavy computations and analysis related to IoT data to generate the models are performed by the database, freeing the processor module to perform monitoring functions and detecting potential faults base on the models.

As discussed, the database module generates models based on analysis of IoT data of reported events. In one embodiment, a conditional probability model is generated by the database module. The conditional probability model analyzes the IoT data to determine causal relationships between any two sensors (sensor pair with first and second sensors) of the production environment. For example, if two sensors are attached to two different tools or devices and are determined to have a causal relationship, the failure of first tool indicated by a first sensor may lead to failure of the second tool associated with the second sensor. The conditional probability model determines event pairs.

As discussed, an alarm event is associated with a sensor ID, time stamp and a message code which indicates the content of the alarm or event message. An event, for example, is an alarm or event record. The records are stored in, for example, an event log file. The records may be stored in chronological order as they occur. For example, the records may be stored from earliest in time to latest in time. An event ID is assigned automatically to an event based on the sequence of occurrence. The event ID, for example, may be assigned by the analyzer server such as the database module. Assigning the event ID by other components may also be useful. For example, the event ID may be assigned by the data collection system or the processor module.

A record is identified by its sensor ID and message code. Records which share common sensor ID and message code are considered a type of event. Events which have different sensor IDs or message codes are considered different types of events. It is understood that the same event type can appear multiple times as well as other types of events within a specified time line.

In one embodiment, events which do not indicate failure or malfunctions are filtered out. For example, events which indicated recovery from abnormal state may be filtered out. This enables the analysis to focus on failure-to-failure relationships between sensors.

As an example, given two types of events—event type A (Event A) and event type B (Event B)—if Event B always follows Event A within a short period of time, then it is reasonable to assume that Event A leads to Event B. This can be set as a rule in the analysis. The probability of event B occurring after event A is determined by equation 1 below:

$$P_{A,B}^T := \frac{N_B(A, T)}{N_A}, \quad \text{(Equation 1)}$$

where $P_{A,B}^T$ is the probability that event B occurs after Event A within time T, $N_B(A,T)$ is the number of times that Event B occurs within time T after the occurrence of Event A, and $N_A$ is the number of times that Event A occurs in the event log file.

As indicated, T is the maximum time difference between Event A and Event B. The length of T may depend on the dynamics of the system. For example, if the system is very dynamic, such as when states change very fast, a short time window length may be used. This ensures consideration of events. On the other hand, if the system is not very dynamic, longer window lengths may be used. For example, the parameter T may be in the range of minutes for very dynamic systems while in the range of hours for less dynamic systems. Other values for T may also be useful.

In other embodiments, event data from event log and other log files, such as time log file are used in the analysis. For example, the analysis includes event data from both the event log file and time log file.

Figure 2:
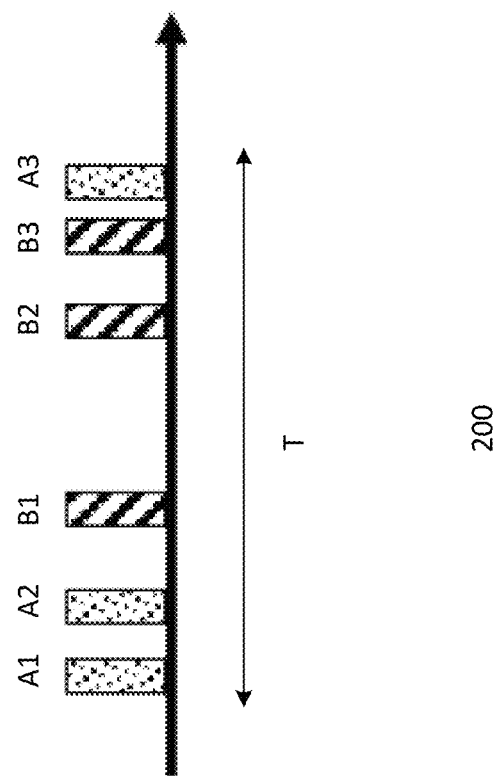
FIG. 2 shows an example of events occurring in a time line.

FIG. 2 illustrates an example 200 of Event A and Event B occurring within time T. As shown, Event A occurred 3 times (A1, A2 and A3) and Event B occurred 3 times (B1, B2 and B3). Six event pairs in which B occurred after A within T can be identified. The six event pairs are (A1, B1), (A2, B1), (A1, B2), (A2, B2), (A1, B3) and (A2, B3). As shown, the event pairs are in order of occurrence, from earliest to latest within the time window of interest. No Event B occurred after A3. The pairs may be assigned event ID pairs. For example, an event ID pair is associated with an event pair. An event ID pair includes event IDs of the events of the pair. An event ID is assigned automatically based on the sequence of occurrence.

In one embodiment, a procedure may be called to identify the event pairs to determine $N_B(A,T)$ and the event ID pairs Using the database module to determine $N_B(A,T)$ improves efficiency since one procedure can be used to calculate $N_B(A,T)$.

Figure 3:
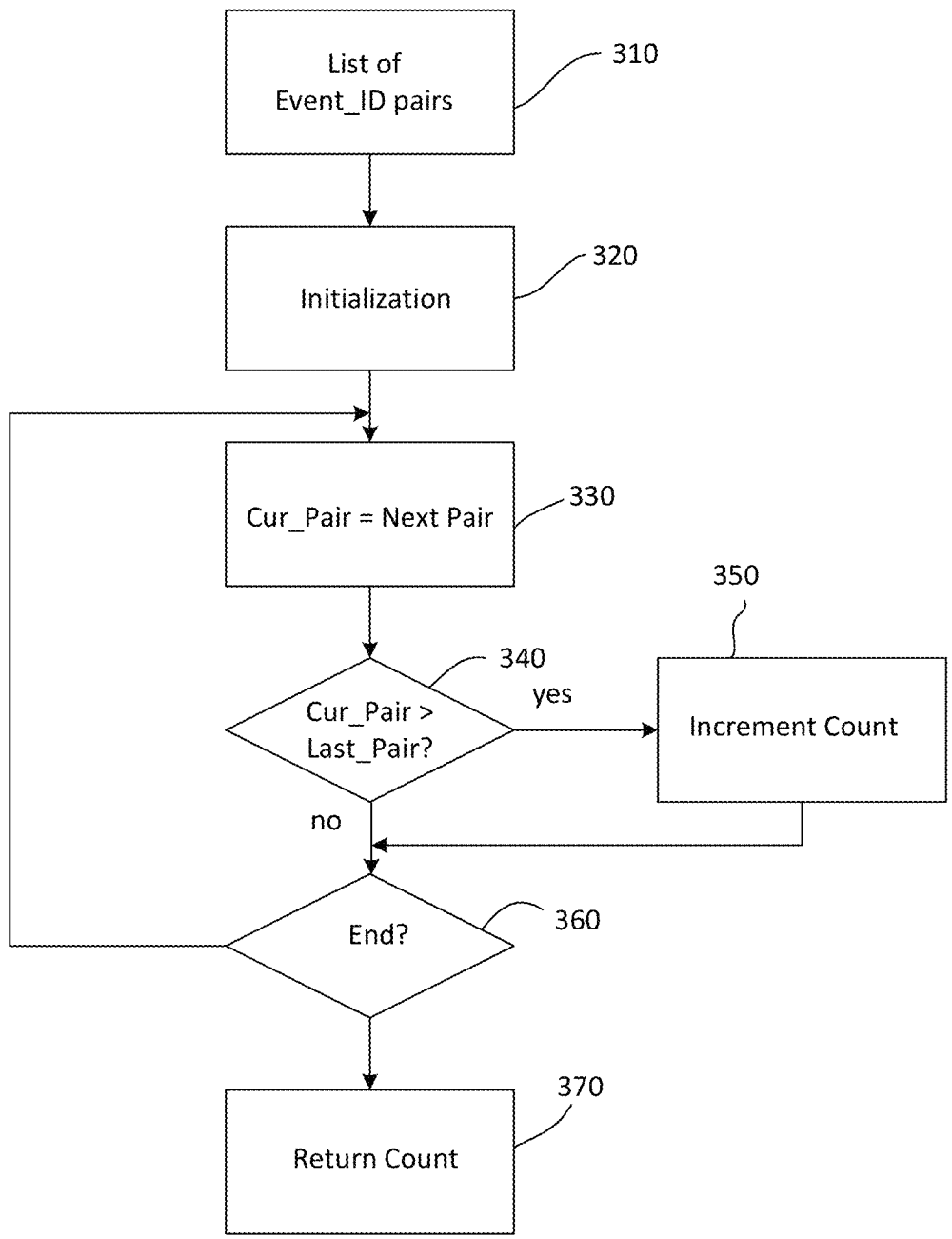
FIG. 3 shows an embodiment of a process for determining $N_B(A,T)$.

FIG. 3 is an embodiment of a process 300 for determining $N_B(A,T)$. The process, for example, may be performed by the database module. At step 310, event_ID pairs are listed. For example, to determine $N_B(A,T)$, the (A, B) pairs in which event B occurs after A within T are identified and provided in the list of event_ID pairs. The list of event_ID pairs are listed in chronological order, from earliest to latest. At step 320, the process is initialized. Initialization, for example, may include setting Last_Pair as the first event ID pair in the list. For example, Last_Pair is the oldest event_ID pair of the list. Additionally, N or the count is initialized to 1.

At step 330, the process sets Cur_Pair as the next pair on the list. The process determines if the Cur_Pair is greater than the Last_Pair at step 340. For example, if both event IDs of the Cur_Pair are larger than those of the Last_Pair, the count is incremented by 1 at step 350 and proceeds to step 360. For example, both events of the Cur_Pair occur later in time with respect to the events of the Last_Pair (e.g., A2>A1 and B2>B1). If Cur_Pair is not greater than the Last_Pair, the process proceeds to step 360. At step 360, the process determines if there are any more event ID pairs to analyze. If there are event_ID pairs remaining in the list to analyze, the process returns to step 330. On the other hand, if there are no more event_ID pairs to analyze, the process returns the count at step 370. For example, $N_B(A,T)$ is returned.

Using the process of FIG. 3, the pairs of FIG. 2 which are counted would be (A1, B1) and (A2, B2). For example, $N_B(A,T)$ is equal to 2.

In one embodiment, the database module analyzes event or IoT data to develop an Apriori model. For example, Apriori analysis is employed by the database module to mine the event data for frequent pattern of alarm events. In one embodiment, the event data is pre-processed to create transactions.

Figure 4A:
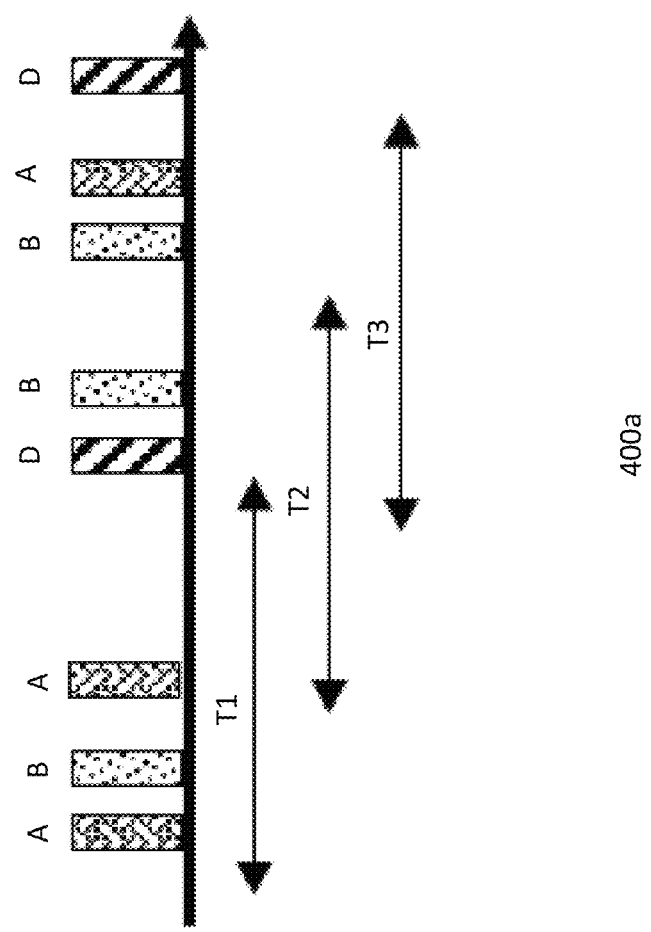
FIGS. 4a-4b show examples of transforming alarm events into transactions.
Figure 4B:
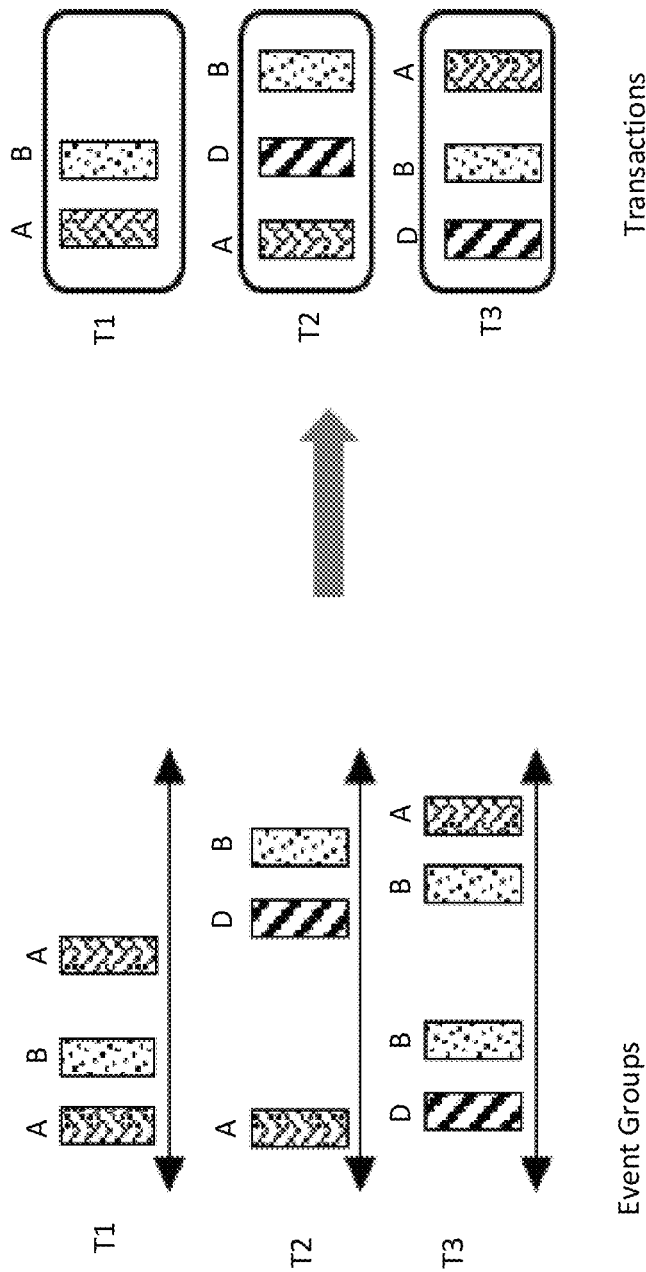

FIGS. 4a-4b show examples of transforming alarm events into transactions. Referring to FIG. 4a, a time line 400a of alarm events are shown. The time line, for example, includes the sequence of event types A, B, A, D, B, B, A and D as they occur in time. The time line is divided into a plurality of time windows. For example, the time line is divided into time windows T1, T2 and T3. The time windows are equal in duration and distributed evenly over the time line. For example, the time windows may be 10 minutes in duration and starts once every minute. The start period should be less than the duration of the window. This ensures that there are no gaps. For example, time-line includes overlapping time windows. Due to overlapping time windows, an event may occur in more than one time window. This also avoids having frequent patterns separated by time windows.

As shown in FIG. 4b, the time windows correspond to event groups. The event group of time window T1 includes A, B and A events, the event group of time window T2 includes A, D and B events and the event group of time window T3 includes D, B, B and A events. The event groups are transformed into transactions. A transaction lists the types of events in the time window. For example, the transaction of time window T1 includes A and B type of events, the transaction for time window T2 includes A, D and B types of events, and the transaction for time window T3 includes D, B and A types of events.

After defining transactions, Apriori analysis is performed to identify frequent patterns. In one embodiment, Apriori analysis is performed by a predictive analysis library (PAL). For example, Apriori analysis is performed by the PAL in SAP HANA.

In one embodiment, an Application Function Modeler (AFM) in SAP HANA Studio may be employed to facilitate building predictive models. For example, the AFM includes a user friendly graphical user interface (GUI) to simply building predictive models.

Figure 5:
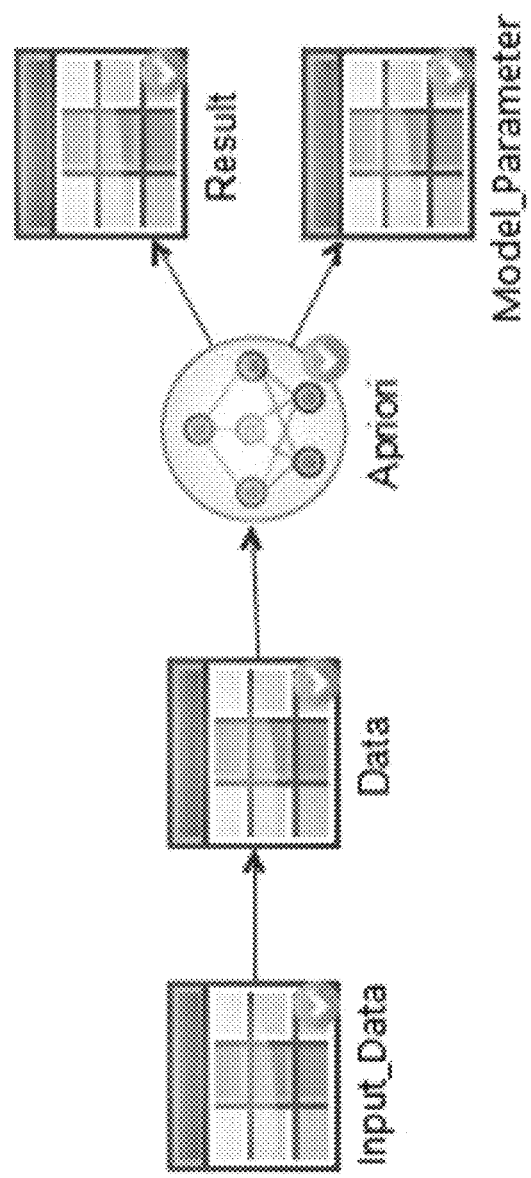
FIG. 5 shows an exemplary graphical user interface (GUI) of an Application Function Modeler (AFM) in SAP HANA Studio.

FIG. 5 shows a GUI 500 of an AFM in SAP HANA studio. As shown, the GUI includes Apriori icons with various items for selection by the user. For example, a user may select from Input_Data, Data, Model_Parameter and Result items with a click of a mouse. A user may define the input data by selecting on the Input_Data item. The input data includes a table with two columns. The first column includes transaction IDs of transactions while the second column includes associated event names of the transaction IDs. Apriori parameters, such as minimum support and minimum confidence level, may be defined by selecting the Model_Parameter item. Defining other parameters may also be useful. The parameters are stored in a parameters table. Results of the Apriori analysis are provided by clicking on the Result item. The results of the analysis may be provided as a result table with five columns, showing respectively the name of the first event, the name of the second event, support of the first event, confidence level of the relationship and lift of the relationship.

The Apriori analysis enables non-sequential relationships of two transactions, which can include multiple events. As such, relationships of multiple events can be identified. For example, the occurrence of two events may lead to the occurrence of two other events.

In one embodiment, both conditional probability and Apriori models are used to discover causal relationships among sensors and tools or devices. The use of both types of models increases probability of identifying related events. Additionally, the use of both models serves to confirm strong relationships of event pairs if both models identify the same event pairs.

The relationships of events from the analysis can be used to predict a failure of a device or tool within the system of devices or tools. For example, a failure of a device may be predicted if another highly related device fails based on the relationships which have been identified.

To monitor or detect a failure in a device, a device health index (DHI) of a tool or device is used. The DHI is monitored by the processor module. For example, the DHI is monitored by an event stream processor (ESP) by SAP Sybase. The monitoring of the DHI is performed in real-time. For example, sensor readings are monitored and compared with the DHI.

Sensors provide one dimensional readings of the device. For example, a sensor provides pressure, temperature or other types of readings of the device. In one embodiment, the one dimensional readings are converted into multi-dimensional tuples. In one embodiment, the one dimensional readings of the sensors are converted into a three dimensional tuple to increase the amount of information provided. In one embodiment, the three dimensional tuple includes original sensor reading, average increment over a moving time window of readings and a standard deviation of the readings in a moving time window. A moving time window is a window of a fixed time length at every time instance of a given time period of interest.

Figure 6:
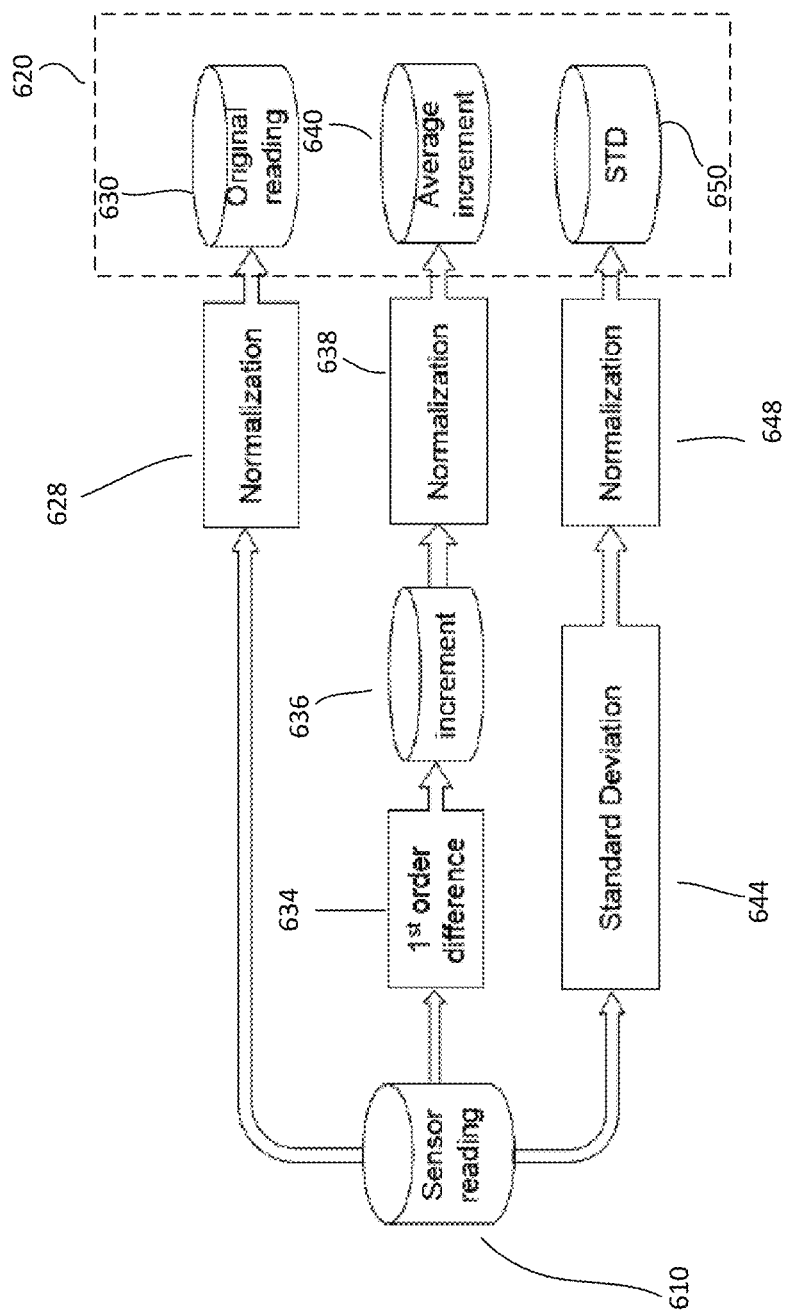
FIG. 6 shows a process for generating a 3-dimensional tuple for Device Health Index (DHI)

FIG. 6 shows a process 600 for generating 3-dimensional tuple for DHI. As shown, original sensor reading 610 is provided. The original sensor reading is normalized to produce a normalized sensor reading 628. The normalized original sensor reading forms a first element 630 of the DHI tuple 620. Normalizing the sensor reading allows different sensor readings to have comparable contribution to the final DHI.

To generate a second element 640 of the tuple, a first order difference 634 of the original sensor readings is computed. For example, a series of sensor readings are used to calculate the first order difference. The first order difference is used to calculate an average increment 636 over the moving time window. The average increment is normalized to get a normalized average increment 638 over time. The normalized average increment forms the second element of the tuple.

As for a third element 650 of the tuple, the standard deviation 644 of the readings in a moving time window is calculated and normalized to produce a normalized standard deviation 648. The normalized standard deviation forms the third element of the tuple. The first, second and third elements together may be used to form the DHI of a device associated with the sensor from which the readings are obtained. In some cases, not all tuples need to be used to form the DHI. For example, the second and third tuples may be used to form the DHI. Other configurations of tuples to form the DHI may also be useful.

There may be instances when a device or a tool include multiple sensors. For example, multiple sensors may be provided to a device for obtaining multiple types of readings. The different types of readings relate to different operating metrics, such as temperature, pressure, fluid level. Other types of readings may also be useful. In such cases, the DHI of the device with multiple sensors may be the average of the three dimensional tuples of all the sensors of the device. For example, the first tuples of the different readings may be combined to obtain the average of the first tuples of different sensors, the second tuples of the different readings may be combined to obtain the average of the second tuples of different sensors and the third tuples of the different readings may be combined to obtain the average of third tuples of different sensors. The averages of the tuples may serve as the DHI of the device. It is understood that not all average tuples need to be used in determining the DHI of the device.

In some embodiments, DHI of certain sensors may be monitored. For example, sensors which have relationships to other sensors may have their DHI monitored. For example, sensors of events which have strong relationships to other events may be monitored. For sensors which do not have relationships to other sensors, they may not need to be monitored. Monitoring DHI of all sensors may also be useful.

In one embodiment, a predictive failure model of the device related to the DHI may be produced by performing anomaly analysis. For example, an anomaly predictive model may be created by the anomaly analysis. Samples of DHI may be obtained from the system in normal state. The samples may be used to generate the anomaly predictive model. In one embodiment, the predictive anomaly model may be generated using SAP HANA PAL. For example, the AFM may be used to generate the predictive anomaly model.

Figure 7:
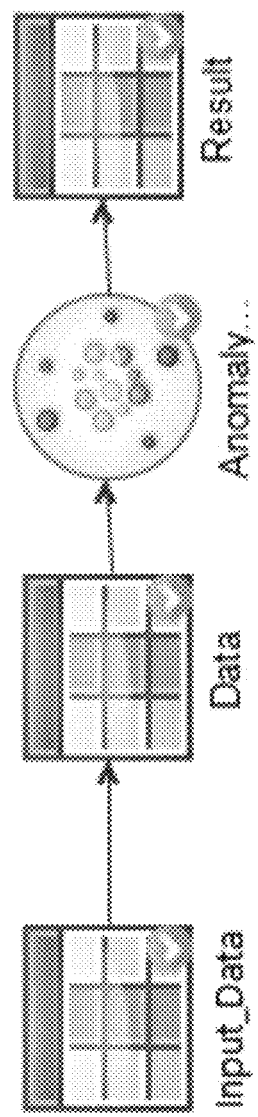
FIG. 7 shows another exemplary GUI of an AFM in SAP HANA Studio.

FIG. 7 shows another exemplary graphical user interface (GUI) 700 of an AFM in SAP HANA studio. As shown, the GUI includes anomaly icon with various items for selection by the user. For example, a user may select from Input_Data, Data and Result items with a click of a mouse. The Input Data may be a table in the database where the DHI is stored. The Data identifies which Input_Data is used for anomaly detection. Results may be a table of the results of the anomaly detection, which is automatically created in the database. The anomaly predictive model is used to determine outliers in real-time using the processor module.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method for diagnosing faults to predict faults comprising:

providing, to an analyzer server, event data of alarm events from sensors, comprising a first sensor and a second sensor, for measuring operating metrics of devices of a system of devices, wherein the event data comprises alarm events for a first device attached to the first sensor and a second device attached to the second sensor;

analyzing, by the analyzer server, the event data to identify relationships of the alarm events, wherein the analyzing comprises performing a conditional probability analysis to determine a causal relationship between the first sensor attached to the first device, and the second sensor attached to the second device, wherein the causal relationship indicates that a failure of the first device indicated by one of the alarm events that is an alarm event for the first sensor may lead to a failure of the second device;

defining, by the analyzer server, a device health index (DHI) based on the identified relationships of the alarm events;

monitoring, by the analyzer server, additional alarm events from the first sensor; and predicting, by the analyzer server, a failure of the second device based on the monitored additional alarm events from the first sensor, the DHI, and the causal relationship between the first sensor and the second sensor.

2. The method of claim 1 wherein the event data comprises "Internet of Things" (IoT) data.

3. The method of claim 1 wherein the sensors comprise different types of sensors for sensing different operating metrics of devices.

4. The method of claim 1, further comprising storing the event data in an event sensor log.

5. The method of claim 1 wherein fields of the event data comprise:

a sensor ID of a sensor;

a time stamp of a time when an alarm event occurred;

a message code indicating a type of alarm event; and an input from an operator.

6. The method of claim 5 wherein the message code of the event data comprises one of:

abnormal sensor reading;

recovery from abnormal status;

threshold value changes; and operator's input message.

7. The method of claim 1, further comprising assigning an event ID to each event data based on a sequence of occurrence.

8. The method of claim 7, further comprising categorizing the alarm events into a plurality of event types based on a sensor ID identifying a sensor of the alarm event and a message code indicating a type of event, wherein alarm events having a same sensor ID and message code are categorized as a same event type.

9. The method of claim 1 wherein performing the conditional probability analysis excludes event data which do not indicate a failure or a malfunction.

10. The method of claim 9 wherein for a given first event type (Event A) and a given second event type B (Event B) and if Event B always follows Event A within a defined period of time T, a probability of Event B occurring after Event A is determined by $$P_{A,B}^T := \frac{N_B(A, T)}{N_A}$$

where
$P_{A,B}^T$ is a probability that event B occurs after Event A within T,
$N_B(A,T)$ is a number of times that Event B occurred within T after an occurrence of Event A, and
$N_A$ is a number of times that Event A occurred.

11. The method of claim 10 wherein determining $N_B(A,T)$ comprises:
determining event pairs having Event B occurring within T after Event A, wherein an event pair includes event ID of Event A (Event A ID) and event ID of Event B (Event B ID);
assigning an event pair ID for an event pair;
listing event pairs in an order in a list;
initializing
N=1,
first event pair of the list=Last_Pair, and
next event pair of the list=Cur_Pair;
determining whether Cur_Pair is greater than Last_Pair,
if Cur_Pair is greater than Last_Pair, then
N=N+1, and
Last_Pair=Cur_Pair; and
determining whether all event pairs in the list have been analyzed,
if there are event pairs which have not been analyzed, then next event pair of the list=Cur_Pair,
and continue analysis from determining whether Cur_Pair is greater than Last_Pair, and
if there all event pairs in the list have been analyzed, then return N which is equal to NB(A,T).

12. The method of claim 8 wherein analyzing the event data comprises performing an Apriori analysis which mines the event data to identify frequent patterns.

13. The method of claim 12 wherein performing the Apriori analysis comprises:
transforming the event data into transactions; and
analyzing the transactions to identify frequent patterns to determine relationship between two transactions.

14. The method of claim 1 wherein the DHI comprises a 3-dimensional tuple, comprising:
an original reading from a sensor, of the sensors;
an average increment over a time window of readings from the sensor; and
a standard deviation of the readings from the sensor in the time window.

15. A system for diagnosing faults to predict faults comprising:
a database module, wherein the database module stores event data of events from sensors for measuring operating metrics of devices of a system of devices, wherein the event data comprises alarm events of devices; and
a processor module, wherein the processor module:
analyzes the event data to identify relationships of the alarm events, wherein the analyzing comprises performing a conditional probability analysis to determine a causal relationship between a first sensor, of the sensors, attached to a first device, of the devices, and a second sensor, of the sensors, attached to a second device, of the devices, wherein the causal relationship indicates that a failure of the first device indicated by an alarm event of the first sensor may lead to a failure of the second device,
monitors additional alarm events from the first sensor and compares the additional alarm events with a DHI which is defined based on the identified relationships of the alarm events, including the causal relationship between the first sensor and the second sensor, and
predicts a failure of the second device based on the monitored additional alarm events from the first sensor, the DHI and the causal relationship between the first sensor and the second sensor.

16. The system of claim 15 wherein the processor module comprises a stream event processor which monitors events from sensors and analyzes a stream data to predict failures based on the DHI.

17. The system of claim 15 wherein analyzing the event data further comprises performing an Apriori analysis which mines the event data to identify frequent patterns to determine relationships of events.

18. A non-transitory computer-readable medium having stored thereon program code, the program code executable by a computer, the program code comprising:
providing, to an analyzer server, event data of events from sensors for measuring operating metrics of devices of a system of devices, wherein the event data comprises alarm events of devices;
analyzing the event data to identify relationships of the alarm events using an Apriori analysis and using a conditional probability analysis to determine a causal relationship between a first sensor, of the sensors, attached to a first device, of the devices, and a second sensor, of the sensors, attached to a second device, of the devices, wherein the causal relationship indicates that a failure of the first device indicated by an alarm event of the first sensor may lead to a failure of the second device; and
monitoring, by the analyzer server, additional alarm events from the first sensor; and
predicting by the analyzer server, a failure of the second device based on the monitored additional alarm events from the first sensor, the causal relationship between the first sensor and the second sensor, and a DHI, wherein the DHI is defined based on identified relationships of events.

* * * * *